(12) United States Patent
Kozaki et al.

(10) Patent No.: US 9,802,234 B2
(45) Date of Patent: Oct. 31, 2017

(54) CURVATURE RETAINING DEVICE FOR PLATE-SHAPED WORKPIECE, CURVATURE RETAINING METHOD FOR PLATE-SHAPED WORKPIECE, AND CURVATURE FORMING METHOD FOR PLATE-SHAPED WORKPIECE

(71) Applicant: MITSUBISHI HEAVY INDUSTRIES, LTD., Tokyo (JP)

(72) Inventors: Takashi Kozaki, Tokyo (JP); Noriaki Fukami, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 349 days.

(21) Appl. No.: 14/361,521

(22) PCT Filed: Nov. 16, 2012

(86) PCT No.: PCT/JP2012/079730
§ 371 (c)(1),
(2) Date: May 29, 2014

(87) PCT Pub. No.: WO2013/084688
PCT Pub. Date: Jun. 13, 2013

(65) Prior Publication Data
US 2014/0366600 A1    Dec. 18, 2014

(30) Foreign Application Priority Data
Dec. 5, 2011    (JP) .................................. 2011-265744

(51) Int. Cl.
*B21D 5/00* (2006.01)
*B64F 5/10* (2017.01)
(Continued)

(52) U.S. Cl.
CPC ............. *B21D 5/004* (2013.01); *B21D 5/006* (2013.01); *B21D 5/0209* (2013.01); *B21D 11/20* (2013.01);
(Continued)

(58) Field of Classification Search
CPC .......... B24C 1/00; B21D 31/06; B21D 53/92; B21D 5/002; B21D 5/004; B21D 5/006;
(Continued)

(56) References Cited

U.S. PATENT DOCUMENTS

| 4,329,862 A | 5/1982 | Harburn et al. |
| 4,470,292 A * | 9/1984 | DeClark ................... G01F 1/30 73/11.02 |

(Continued)

FOREIGN PATENT DOCUMENTS

| CN | 101288888 | 10/2008 |
| JP | 1-177027 | 12/1989 |

(Continued)

OTHER PUBLICATIONS

Decision to Grant a Patent issued Aug. 31, 2015 in corresponding Chinese patent application No. 201280059486.5 (with English translation).

(Continued)

*Primary Examiner* — R. K. Arundale
*Assistant Examiner* — Mohammad Yusuf
(74) *Attorney, Agent, or Firm* — Wenderoth, Lind & Ponack, L.L.P.

(57) ABSTRACT

A curvature retaining device (1) includes two support points (25a) that can abut against one surface of a plate-shaped workpiece W, one or more pressing points (40a) that can abut against a position of the other surface of the plate-shaped workpiece (W) between the support points (25a), and forward/backward drive means (support unit (23) and (Continued)

pressing unit (33)) for moving at least either the support points (25a) or the pressing points (40a) forward to and backward from the other. Preferably, the two support points (25a) abut against the one surface of the plate-shaped workpiece (W) at a first distance (Ls), the two pressing points (40a) abut against the other surface of the plate-shaped workpiece (W) at second distance (Lp) shorter than the first distance (Ls), and a middle point of the first distance (Ls) and a middle point of the second distance (Lp) match with each other.

8 Claims, 7 Drawing Sheets

(51) Int. Cl.

| | | |
|---|---|---|
| *B21D 31/06* | (2006.01) | |
| *B21D 11/10* | (2006.01) | |
| *C21D 7/06* | (2006.01) | |
| *B21D 5/02* | (2006.01) | |
| *B30B 1/18* | (2006.01) | |
| *B24C 1/10* | (2006.01) | |
| *B21D 11/20* | (2006.01) | |
| *B21D 53/92* | (2006.01) | |
| *B21D 31/00* | (2006.01) | |

(52) U.S. Cl.
CPC ............... *B21D 31/06* (2013.01); *B24C 1/10* (2013.01); *B30B 1/186* (2013.01); *B64F 5/10* (2017.01); *C21D 7/06* (2013.01); *B21D 31/005* (2013.01); *B21D 53/92* (2013.01)

(58) Field of Classification Search
CPC ...... B21D 5/0209; B21D 5/01; B21D 5/0227; B21D 7/06; B21D 7/14; B21D 11/22; B21D 11/20; B21D 31/005; C21D 7/06
USPC ..................................................... 72/381, 53
See application file for complete search history.

(56) References Cited

U.S. PATENT DOCUMENTS

| | | | |
|---|---|---|---|
| 6,341,516 B1 | 1/2002 | Narushima et al. | |
| 6,467,323 B1 | 10/2002 | Narushima et al. | |
| 6,938,448 B2* | 9/2005 | Kennerknecht | ........ B21D 31/06 72/53 |
| 7,168,364 B2* | 1/2007 | Schneider | ............. B21C 51/005 101/26 |
| 2002/0050157 A1 | 5/2002 | Kennerknecht et al. | |
| 2002/0104356 A1 | 8/2002 | Narushima et al. | |
| 2003/0177805 A1 | 9/2003 | Tazoe | |
| 2003/0188559 A1 | 10/2003 | Narushima et al. | |
| 2003/0192360 A1 | 10/2003 | Narushima et al. | |
| 2006/0075800 A1* | 4/2006 | Frohlich | ............... B21C 51/005 72/430 |
| 2010/0199736 A1* | 8/2010 | Fujita | ........................ B24C 1/10 72/53 |
| 2013/0002444 A1* | 1/2013 | Bitzel, Jr. | ............ G01B 11/303 340/686.5 |

FOREIGN PATENT DOCUMENTS

| | | |
|---|---|---|
| JP | 6-226365 | 8/1994 |
| JP | 2000-622 | 1/2000 |
| JP | 2000-117331 | 4/2000 |
| JP | 2000-301248 | 10/2000 |
| JP | 2001-137971 | 5/2001 |
| JP | 2004-130369 | 4/2004 |
| JP | 3740103 | 2/2006 |
| JP | 3869783 | 1/2007 |
| JP | 4669636 | 4/2011 |

OTHER PUBLICATIONS

Decision to Grant a Patent issued Nov. 4, 2015 in corresponding Japanese patent application No. 2011-265744.
Extended European Search Report issued Jun. 16, 2015, in European Application No. 12855324.5.
Office Action issued Feb. 13, 2015 in corresponding Chinese patent application No. 201280059486.5 (with English translation).
Wei Long, "The research on the control system of small-hole shot-blast intensity", Issue 4 in vol. 28 of the Machinery, pp. 17-19; Aug. 28, 2001.
International Search Report issued Feb. 12, 2013 in International Application No. PCT/JP2012/079730.
Written Opinion of the International Searching Authority issued Feb. 12, 2013 in International Application No. PCT/JP2012/079730.

* cited by examiner

FIG. 1

(AFTER PIN MOLDING)

CURVATURE RETAINING DEVICE FOR PLATE-SHAPED WORKPIECE, CURVATURE RETAINING METHOD FOR PLATE-SHAPED WORKPIECE, AND CURVATURE FORMING METHOD FOR PLATE-SHAPED WORKPIECE

TECHNICAL FIELD

The present invention relates to a curvature retaining device for a plate-shaped workpiece, a curvature retaining method for a plate-shaped workpiece, and a curvature forming method for a plate-shaped workpiece for retaining a plate-shaped workpiece in a curved state and performing processing such as peen forming thereon.

BACKGROUND ART

In recent years, a forming method called peen forming or shot peening is in wide use in a case where a metallic plate having a large area and a complex curved surface, such as aircraft wings, is formed. As disclosed in PTL 1 and 2, according to this forming method, a metallic plate-shaped workpiece is retained and a steel ball with a diameter of approximately 0.5 mm to approximately 4 mm, which is called a shot, is projected at a high speed toward the plate-shaped workpiece to cause a strong collision, generate plastic strain in the plate-shaped workpiece, and perform curvature forming into a desired shape.

It is known that elastic stress (stress) that is applied to the plate-shaped workpiece accelerates a deformation of the plate-shaped workpiece and significantly increased formability is achieved when the shot is projected after curving and retaining the plate-shaped workpiece in an elastic deformation range thereof in advance during the peen forming. This technique is called stress peen forming. In PTL 2, as shown in FIG. 8(b) thereof, the plate-shaped workpiece is forced to be along a backing tool and is fixed with a fixing tool during the stress peen forming such that the plate-shaped workpiece is elastically deformed.

In addition, a plate-shaped workpiece may be retained in a curved state by using a clamp-shaped retaining device and a retaining device using a hydraulic jack without using a backing tool. In this case, a template (R-shaped template) that has a predetermined curvature allowing for spring back is applied to a curved surface of the plate-shaped workpiece and the predetermined curvature is set while the curvature is checked such that stress is applied by the above-described retaining devices for the plate-shape workpiece to have a curvature equal or similar to that of a completed shape after peen forming.

CITATION LIST

Patent Literature

[PTL 1] Japanese Patent No. 3740103
[PTL 2] Japanese Patent No. 3869783

SUMMARY OF INVENTION

Technical Problem

However, in the method for elastically deforming the plate-shaped workpiece by using the backing tool, the backing tool is required to be huge to respond to a curvature varying in a longitudinal direction in a complicated manner, such as that of an aircraft main win and such huge backing tools have to be prepared for a plurality of models and sites. As such, costs are required for the manufacturing of the backing tools, and huge spaces are required for the storage of the backing tools.

In the method for retaining the plate-shaped workpiece in a curved state by using the clamp-shaped retaining device and the retaining device using the hydraulic jack without using the backing tool, the adjustment of strokes of the retaining devices, the maintenance of the curved shape by using the template, and the like are likely to depend on the workmanship of an operator. Accordingly, problems are likely to arise regarding the reproducibility of the shape of the processed plate-shaped workpiece, that is, product uniformity.

Further, in recent years, an integral skin in which an outer plate called a skin and a rib-shaped reinforcing member called a stringer, which is disposed inside the outer plate, are integrated with each other is in wide use in aircraft wings. In a case where the integral skin is curvature-formed through the above-described stress peen forming, it is difficult to use mold members, such as tools and templates, which apply a curved shape without causing any interference with the stringer.

The present invention has been made in view of the above-described problems, and an object thereof is to provide a curvature retaining device for a plate-shaped workpiece, a curvature retaining method for a plate-shaped workpiece, and a curvature forming method for a plate-shaped workpiece with which a curved shape can be freely applied to a plate-shaped workpiece without having to use a mold member but by using a simple and highly universal configuration and high universality is achieved to the point of application to an integral skin.

Solution to Problem

The present invention adopts the following means in order to address the above-described problems.

According to a first aspect of the present invention, there is provided a curvature retaining device for a plate-shaped workpiece curving and retaining the plate-shaped workpiece in an elastic deformation range thereof, the curvature retaining device including two support points that can abut against two separate points of one surface of the plate-shaped workpiece when seen from a direction orthogonal to a curved cross section of the plate-shaped workpiece, one or more pressing points that can abut against positions of the other surface of the plate-shaped workpiece between the support points when seen from the direction orthogonal to the curved cross section of the plate-shaped workpiece, and forward/backward drive means for moving at least either the two support points or the pressing point forward and backward in a thickness direction of the plate-shaped workpiece.

According to the above-described configuration, the plate-shaped workpiece is interposed between the two support points and the one or more pressing points and at least either the support points and the pressing points are moved to the plate-shaped workpiece by the forward/backward drive means, and thus the plate-shaped workpiece is pressed by the pressing points and the plate-shaped workpiece is curved. In this case, any curvature can be set by relative positions of the support points and the pressing points along a plane direction of the plate-shaped workpiece, the quantity of the support points and the pressing points, the amount of pressing by the pressing points, and the like.

In addition, the support point and the pressing point may not be arranged on the same straight line, but a twisted curved shape or the like can be applied to the plate-shaped workpiece by shifting the relative positions of the support point and the pressing point in the plane direction of the plate-shaped workpiece. As such, a curved shape can be freely applied to the plate-shaped workpiece by the single curvature retaining device regardless of the shape and size of the plate-shaped workpiece, an intended curved shape, and the like.

Accordingly, the plate-shaped workpiece can be curved by a simple and highly universal configuration without having to prepare a mold member such as a backing tool and a template as in the related art. Still, since the support point and the pressing point are in point contact with the plate-shaped workpiece, even an integral skin such as an aircraft wing in which an outer plate (skin) and a rib-shaped reinforcing member (stringer) are integrated with each other can be simply curved by allowing the support points or the pressing points to abut against sites other than the reinforcing member.

In addition, in the curvature retaining device for a plate-shaped workpiece according to the first aspect, the two support points may abut against the one surface of the plate-shaped workpiece at a first distance and the two pressing points may abut against the other surface of the plate-shaped workpiece at a second distance shorter than the first distance when seen from the direction orthogonal to the curved cross section of the plate-shaped workpiece, and a middle point of the first distance and a middle point of the second distance may match with each other.

According to the above-described configuration, the curvature of the plate-shaped workpiece in a section between the two pressing points is uniform and symmetrical, and the plate-shaped workpiece is likely to be consistent with a desired curvature. In addition, in a case where the curvature forming is performed on the curved plate-shaped workpiece through peen processing, formability thereof can be increased.

In addition, in the curvature retaining device for a plate-shaped workpiece according to the first aspect, at least either the support point or the pressing point can be moved independently in a plane direction of the plate-shaped workpiece.

In a case of the above-described configuration, the curved shape and the curvature of the plate-shaped workpiece can be freely set by moving, for example, the position of either the support point or the pressing point in the plane direction of the plate-shaped workpiece. For example, the plate-shaped workpiece can be curved into a distorted or twisted shape when the support points and the pressing points are arranged not to be lined up on a straight line in the direction that is orthogonal to the curved cross section of the plate-shaped workpiece.

In addition, in a case where a plurality of the support points and a plurality of the pressing points are disposed and all of these can be moved in the plane direction of the plate-shaped workpiece, the plate-shaped workpiece can easily respond to even a complex composite curved surface. Furthermore, the numbers of the support points and the pressing points that abut against the plate-shaped workpiece can be adjusted to the quantity meeting the size of the plate-shaped workpiece.

In addition, in the curvature retaining device for a plate-shaped workpiece according to the first aspect, the forward/backward drive means may be disposed to be capable of moving all of the support points and the pressing point forward and backward independently from each other.

According to the above-described configuration, forward/backward positions (amounts of protrusion) of the plurality of support points and the plurality of pressing points with respect to the plate-shaped workpiece can be different from each other. As such, the plate-shaped workpiece can be curvature-retained on the complex composite curved surface or the like.

In addition, the curvature retaining device for a plate-shaped workpiece according to the first aspect may include a workpiece support member supporting the plate-shaped workpiece from below, the workpiece support member may be biased from below by biasing means, and the biasing means may be set to have a biasing strength at which a weight of the plate-shaped workpiece itself can be supported and a reaction force added by manipulating the plate-shaped workpiece when curvature forming is performed on the plate-shaped workpiece can be absorbed.

According to the above-described configuration, the plate-shaped workpiece before the curvature retaining can be reliably retained by the workpiece support member, and thus stability can be increased. In addition, although the plate-shaped workpiece is manipulated and the reaction force is added to the workpiece support member when the curvature retaining is initiated, the reaction force of the plate-shaped workpiece is absorbed by a biasing member that biases the workpiece support member in this case, and thus the plate-shaped workpiece is likely to be curved into a desired shape.

In addition, in the curvature retaining device for a plate-shaped workpiece according to the first aspect, the workpiece support member may be a rolling element and may be capable of sending the plate-shaped workpiece placed thereon in the plane direction.

According to the above-described configuration, in a case where the plate-shaped workpiece having a large area is subjected to curvature forming, the plate-shaped workpiece is sent in the plane direction with ease after the curvature retaining at a predetermined site is completed and pressurization by the support points and the pressing points is released for a moment, and the pressurization by the support points and the pressing points is performed again such that other sites of the plate-shaped workpiece can be curved.

In addition, in the curvature retaining device for a plate-shaped workpiece according to the first aspect, the forward/backward drive means for moving the support point forward and backward may be configured to transmit power of an actuator to the support point via a ball screw mechanism.

According to the above-described configuration, when the plate-shaped workpiece is installed between the support point and the pressing point and the plate-shaped workpiece is curved by shortening the distance between the support point and the pressing point with the forward/backward drive means, the support point that is moved forward and backward via the ball screw mechanism is not moved backward with respect to a pressurizing force added from the pressing point. As such, the amount of pressing and a pressing force by the pressing point can be controlled with accuracy, and the formability of the plate-shaped workpiece can be increased.

In addition, the curvature retaining device for a plate-shaped workpiece according to the first aspect may further include forward/backward position detection means for detecting a forward/backward position of each of the support point and the pressing point, and control means into which forward/backward position data from the forward/backward position detection means is input for a predetermined forward/backward position.

According to the above-described configuration, control can be performed such that a relative distance between the support points and the pressing points becomes proper. In this manner, an accurate curvature can be applied to the plate-shaped workpiece.

In addition, the curvature retaining device for a plate-shaped workpiece according to the first aspect may further include load detection means for detecting a load added to the pressing point, and control means into which load data from the load detection means is input, the control means driving the drive means such that a predetermined load is added.

For example, an accurate curvature can be applied, by using the simple configuration described above, to the plate-shaped workpiece in a case, for example, where the peen processing is performed in a state where the plate-shaped workpiece is curvature-retained and the plate-shaped workpiece is subjected to a plastic deformation to maintain the curved shape. In other words, if the support point has a position retaining function to be stopped at a height where the support point reaches the plate-shaped workpiece regardless of a relative relationship between the height of the plate-shaped workpiece before curving and the height of the support point, then the plate-shaped workpiece can be curved by moving only the pressing point to a plate-shaped workpiece side while detecting the load which is added to the pressing point with the load detection means.

In addition, in the curvature retaining device for a plate-shaped workpiece according to the above-described configuration, the control means may perform control such that projection of a shot is stopped at a point of time when a decrease in the load data input from the load detection means is stopped or at a point of time when the load data reaches a predetermined load value in a case where peen forming is performed through the projection of the shot while the plate-shaped workpiece is curved.

In a case of the above-described configuration, the reaction force to return the plate-shaped workpiece to be flat decreases and the load data that is input from the load detection means to the control means decreases as the shot is projected onto the curvature-retained plate-shaped workpiece and the peen processing is in progress. Accordingly, the peen processing of the plate-shaped workpiece can be determined to be completed and the peen processing can be completed at a point of time when a decrease in the load data is stopped or at a point of time when the load data reaches a predetermined load value. As such, time required for the peen processing can be minimized, and contribution can be made to shortening of processing time and reduction of labor.

In addition, the curvature retaining device for a plate-shaped workpiece according to the first aspect may further include curvature detection means for detecting a curvature of the plate-shaped workpiece, and control means into which curvature data from the curvature detection means is input, the control means driving the drive means for a predetermined curvature.

According to the above-described configuration, the relative positions of the support points and the pressing points are set by the control means driving the forward/backward drive means until the plate-shaped workpiece reaches a predetermined curvature. In this manner, an accurate curvature can be achieved since the relative positions of the support points and the pressing points are determined while an actual curvature of the plate-shaped workpiece is measured.

According to a second aspect of the present invention, there is provided a curvature retaining method for a plate-shaped workpiece for curving and retaining a plate-shaped workpiece in an elastic deformation range thereof, in which the plate-shaped workpiece is curved by allowing two or more support points to abut against one surface of the plate-shaped workpiece, allowing one or more pressing points to abut against positions of the other surface of the plate-shaped workpiece between the support points, and moving at least either the support point or the pressing point forward in a thickness direction of the plate-shaped workpiece.

According to the above-described method, the plate-shaped workpiece is interposed between the two or more support points and the one or more pressing points and at least either the support points and the pressing points are moved forward in the thickness direction of the plate-shaped workpiece, and thus the plate-shaped workpiece can be pressed by the pressing points and the plate-shaped workpiece can be curved. In this case, any curvature can be set by the relative positions of the support points and the pressing points along the plane direction of the plate-shaped workpiece, the quantity of the support points and the pressing points, the amount of pressing by the pressing points, and the like.

In addition, a twisted curved shape can be applied to the plate-shaped workpiece by shifting the relative positions of the support point and the pressing point in the plane direction of the plate-shaped workpiece. As such, a curved shape can be freely applied to the plate-shaped workpiece regardless of the shape and size of the plate-shaped workpiece, an intended curved shape, and the like.

Accordingly, the curved shape can be applied to the plate-shaped workpiece without having to prepare a mold member such as a backing tool and a template as in the related art. Still, since the support point and the pressing point are in point contact with the plate-shaped workpiece, even an integral skin such as an aircraft wing in which an outer plate (skin) and a rib-shaped reinforcing member (stringer) are integrated with each other can be simply curvature-formed by allowing the support points or the pressing points to abut against sites other than the reinforcing member.

In addition, in the curvature retaining method for a plate-shaped workpiece according to the second aspect, the plate-shaped workpiece may be curvature-retained in a state where the two support points are allowed to abut against the one surface of the plate-shaped workpiece at a first distance, the two pressing points are allowed to abut against the other surface of the plate-shaped workpiece at a second distance shorter than the first distance, and a middle point of the first distance and a middle point of the second distance match with each other.

According to the above-described method, the curvature of the plate-shaped workpiece in a section between the two pressing points is uniform and symmetrical, and thus the plate-shaped workpiece is likely to be consistent with a desired curvature.

In addition, according to a third aspect of the present invention, there is provided a curvature forming method for a plate-shaped workpiece, in which the plate-shaped workpiece is curved by performing peen forming through projection of a shot from one surface of the plate-shaped workpiece while the plate-shaped workpiece is curvature-retained by using the curvature retaining device for a plate-shaped workpiece according to the first to eleventh aspects.

According to this method, the plate-shaped workpiece is curvature-retained in an elastic deformation range thereof in advance by the curvature retaining device, and the peen forming is performed in this state through the projection of the shot, and thus elastic stress (stress) that is applied to the plate-shaped workpiece accelerates a deformation of the plate-shaped workpiece, and thus formability of the plate-shaped workpiece can be significantly increased.

Advantageous Effects of Invention

As described above, according to the curvature retaining device and the curvature retaining method for a plate-shaped workpiece of the present invention, the curved shape can be applied to the plate-shaped workpiece that is subjected the curvature forming without having to use the mold member but by using the simple and highly universal configuration. The present invention is particularly suitable for the curvature retaining of the integral skin used in aircraft wings, in which the outer plane (skin) and the reinforcing member (stringer) are integrated with each other.

DESCRIPTION OF EMBODIMENTS

Hereinafter, an embodiment of the present invention will be described with reference to FIGS. 1 to 6.

Figure 5:
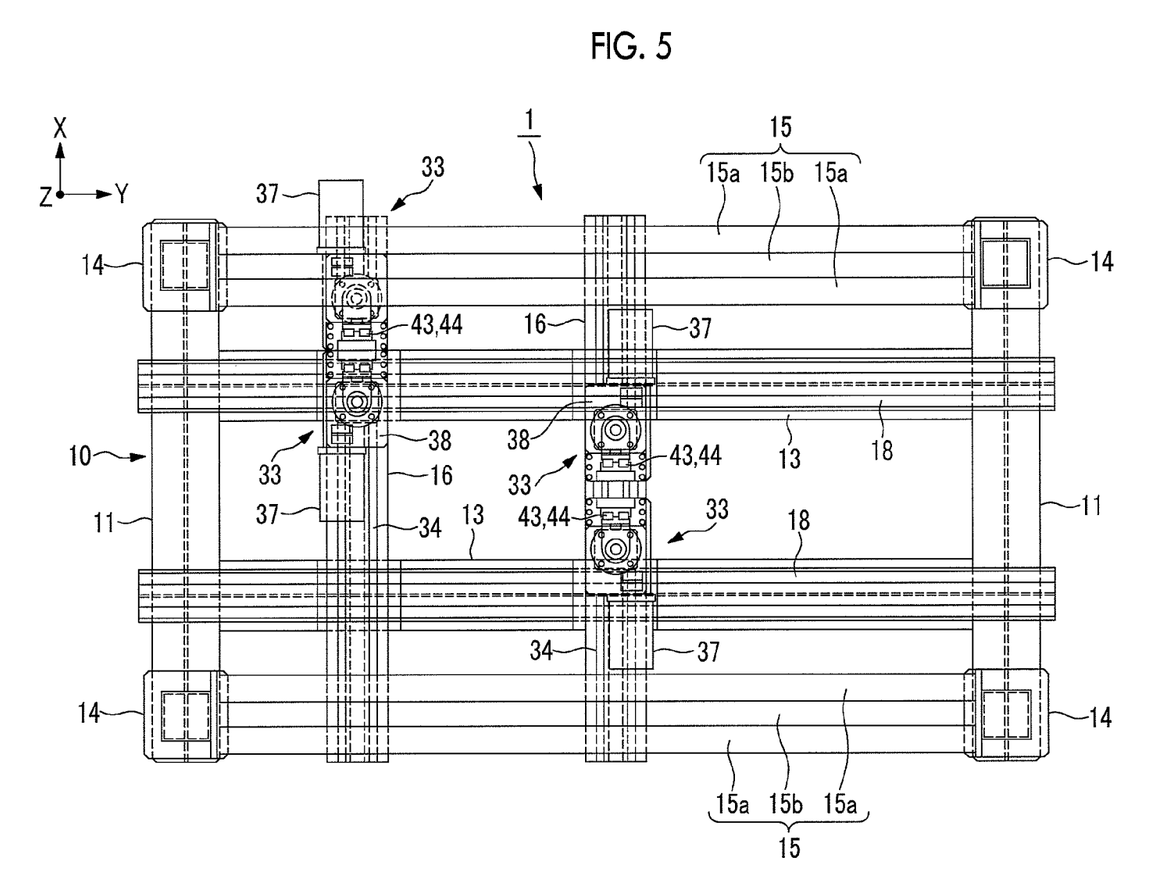
FIG. 5 is a plan view seen from arrow V of FIG. 4.

A curvature retaining device 1 according to this embodiment is formed to have a rectangular shape (oblong shape) in a plan view (refer to FIG. 5). For convenience of description, a direction along one side thereof (short direction) is referred to as an X-axis direction, a direction along the other side (longitudinal direction) is referred to as a Y-axis direction, and a height direction is referred to as a Z-axis direction.

Figure 1:
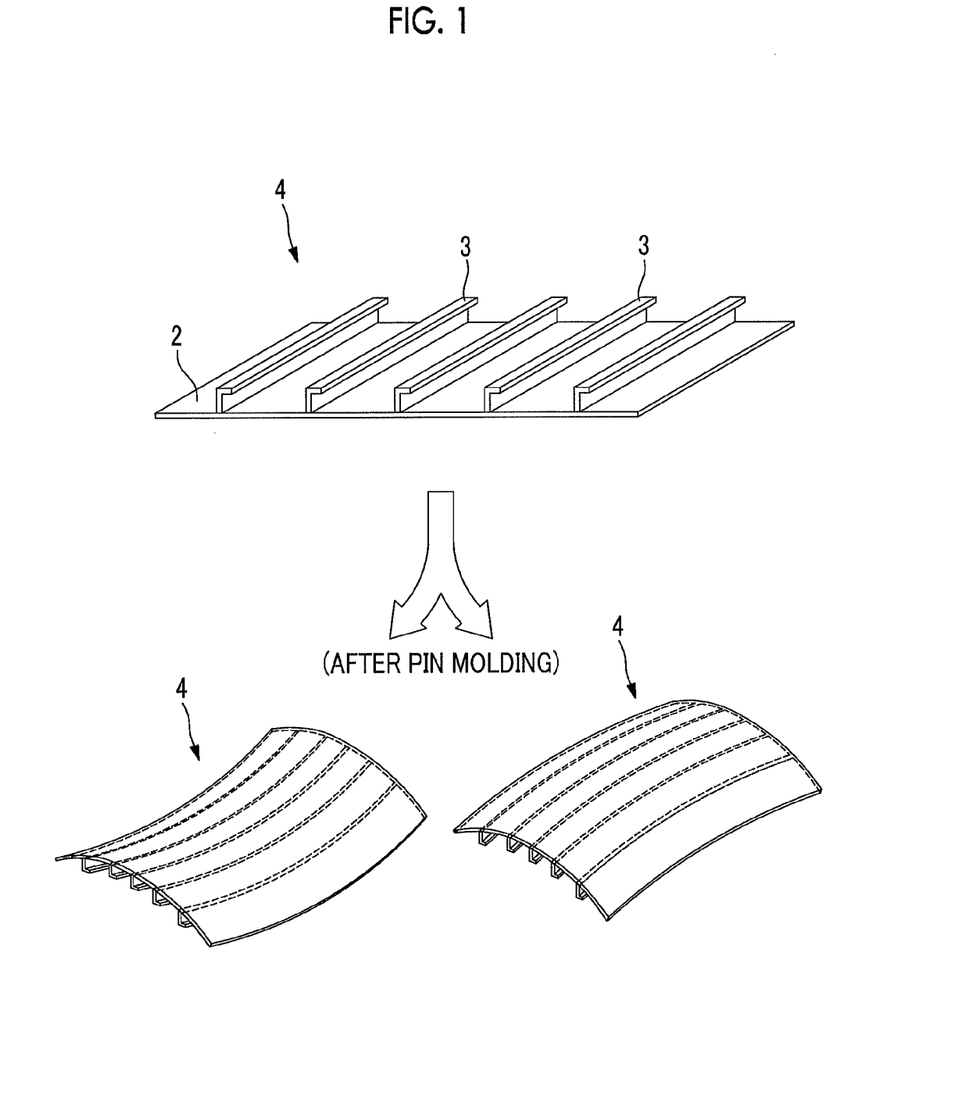
FIG. 1 is a perspective view showing an example of curvature forming of an integral skin of an aircraft.

The curvature retaining device 1 is a pre-stress retaining device that performs stress peen forming by curving and retaining an integral skin 4 in an elastic deformation range thereof in advance and projecting a shot in this state for curvature forming of the integral skin 4 when the integral skin 4 for an aircraft in which an outer plate 2 of aluminum alloy called a skin and a rib-shaped reinforcing member 3 called a stringer are integrated with each other as shown in, for example, FIG. 1 is curved into a saddle shape and a spherical shape through the peen forming. However, any general flat metal plate can be curvature-retained instead of the integral skin 4. In the following description, a flat plate-shaped workpiece W will be curvature-retained.

Figure 2:
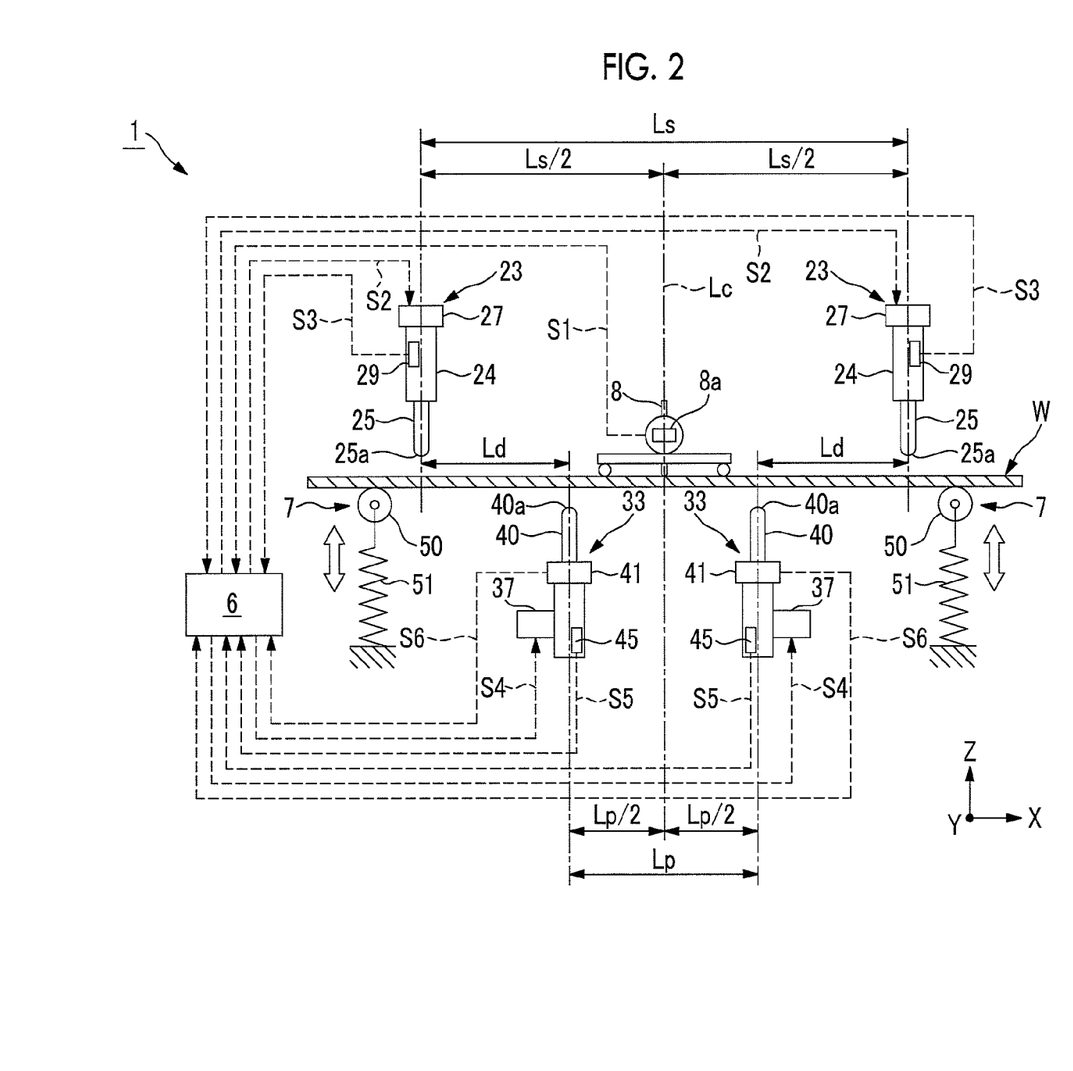
FIG. 2 is a view showing a basic schematic configuration of a curvature retaining device according to the present invention.
Figure 3:
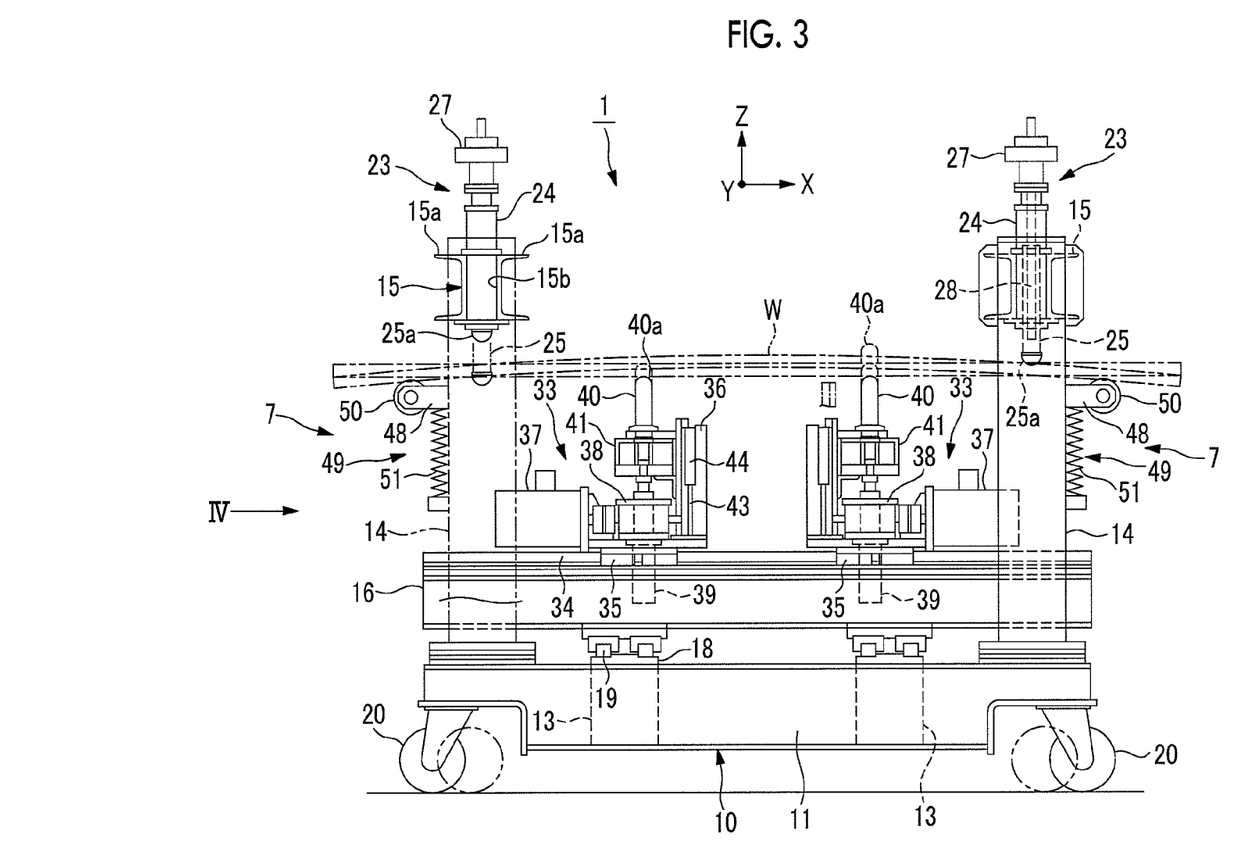
FIG. 3 is a front view showing a specific example of the curvature retaining device according to the present invention.
Figure 4:
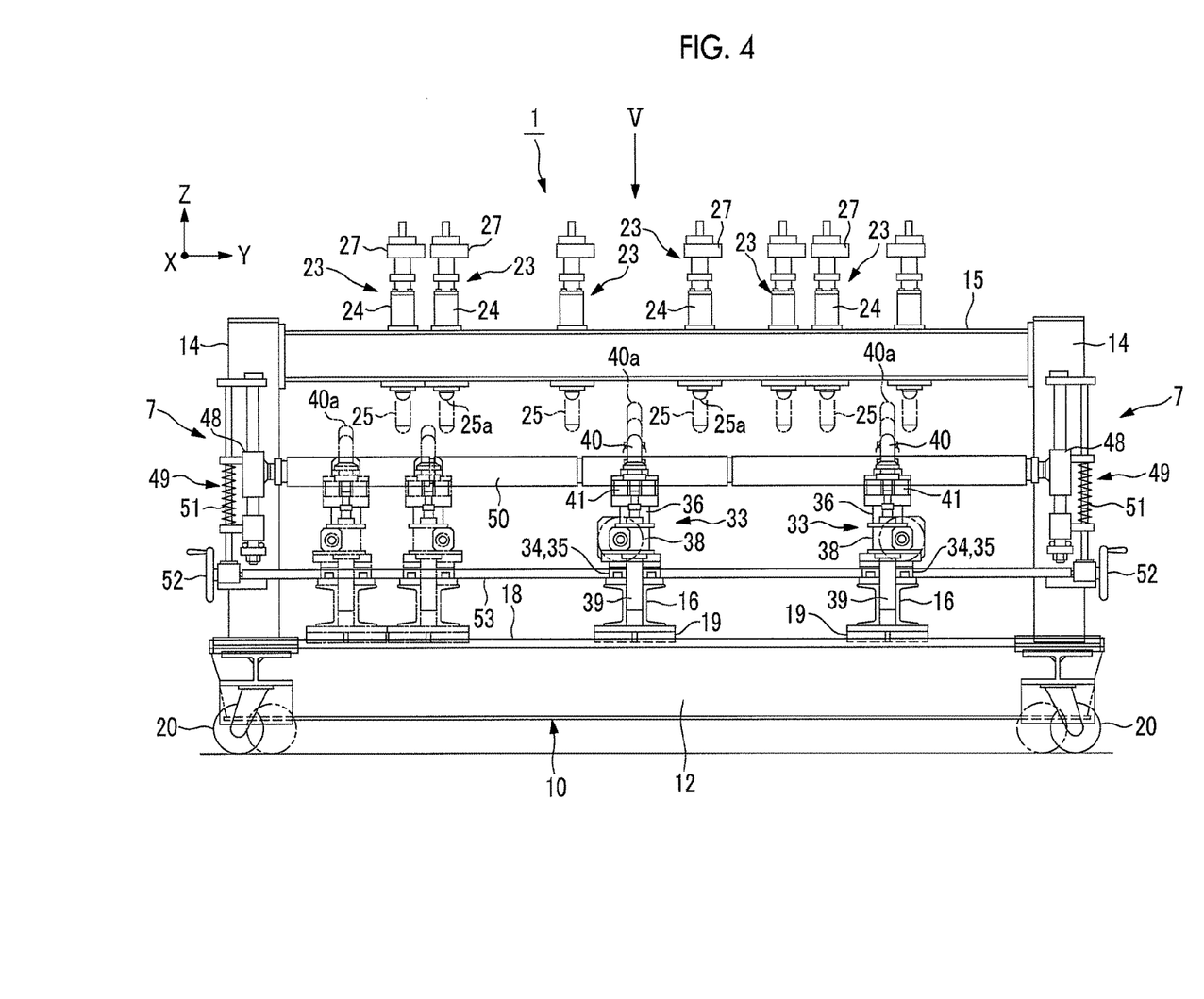
FIG. 4 is a side view seen from arrow IV of FIG. 3.

FIG. 2 shows a basic schematic configuration of the curvature retaining device 1. FIGS. 3 to 5 are a front view, a side view, and a plan view respectively showing a specific example of the curvature retaining device 1. When seen from the Y-axis direction (refer to FIGS. 2 and 3), the curvature retaining device 1 includes two support points 25a that can abut against one surface (for example, an upper surface) of the plate-shaped workpiece W which is horizontally installed, and two pressing points 40a that can abut against the other surface (for example, a lower surface) of the plate-shaped workpiece W at positions between the two support points 25a in the X direction.

When seen from the Y-axis direction shown in FIG. 3, the number of the support points 25a disposed is two and the number of the pressing points 40a disposed is two. However, when seen from the X-axis direction shown in FIG. 4, a plurality of the support points 25a and a plurality of the pressing points 40a are arranged in the Y-axis direction. In this embodiment, the number of the support points 25a arranged in the Y-axis direction is, for example, six, and the total number of the support points 25a disposed is 12. In addition, the number of the pressing points 40a arranged in the Y-axis direction is, for example, two, and the total number of the support points 25a disposed is four. Further, as shown in FIG. 2, the curvature retaining device 1 includes a control unit 6 (control means), reaction force absorbing devices 7, and a curvature measuring instrument 8 (curvature detection means). The curvature measuring instrument 8 is put onto the upper surface or the like of the plate-shaped workpiece W to measure and detect a curvature of the plate-shaped workpiece W. The curvature data is displayed in a display unit 8a and is input into the control unit 6 as well via a control line S1.

As shown in FIG. 2, when seen from a direction (Y-axis direction) that is orthogonal to a curved cross section of the plate-shaped workpiece W, a basic positional relationship of the support points 25a and the pressing points 40a is a state where the two support points 25a abut against the lower surface of the plate-shaped workpiece W at a distance Ls (first distance), the two pressing points 40a abut against the upper surface of the plate-shaped workpiece W at a distance Lp (second distance) which is shorter than the distance Ls, and a middle point of the distance Ls and a middle point of the distance Lp match with each other on a center line Lc.

The curvature retaining device 1 includes a base frame 10 that is formed into a rectangular shape (oblong shape) when seen in a plan view by two beam-shaped transverse frame materials 11 which extend in the X-axis direction in parallel with each other and two beam-shaped vertical frame materials 12 which extend in the Y-axis direction in parallel with each other, and two lower cross beams 13 that extend in the Y-axis direction are bridged between the transverse frame materials 11 which face each other. In addition, support columns 14 extend along the Z-axis direction from four respective corners of the base frame 10, and upper ends of the support columns 14 that line up in the Y-axis direction are connected with each other by two upper cross beams 15 which extend in the Y-axis direction. Furthermore, two movable beams 16 that extend in the X-axis direction are placed on the lower cross beams 13. The movable beams 16 can be moved smoothly in the Y-axis direction by guide rails 18 and linear bearings 19 that are laid on upper surfaces of the lower cross beams 13. Casters 20 with brakes for moving and fixing are disposed on lower surfaces of the four corners of the base frame 10.

As shown in FIG. 3, the upper cross beam 15 has a structure in which two channel materials 15a are arranged back to back at a distance and a slit 15b that has a constant width is formed therebetween. A plurality of (six herein) support units 23 (forward/backward drive means) are arranged in the slit 15b. Each of the support units 23 has a telescopic cylinder structure. An axis of a cylinder 24 thereof is oriented in the Z-axis direction, and a support rod 25 is moved forward and backward from the cylinder 24 downward. A tip end of the support rod 25 is the support point 25a described above. Each of the support units 23 can be moved in the Y-axis direction along the upper cross beam 15 (slit 15b), and can be fixed to any position meeting a pressing site of the plate-shaped workpiece W. The movement of the support units 23 may be performed manually or by a drive mechanism (not shown).

Servomotors 27 are disposed as actuators at respective upper ends of the cylinders 24 of the support units 23. Power (torque) of the servomotor 27 is transmitted to the support rod 25 (support point 25a) via a ball screw mechanism 28 (refer to FIG. 3) such that the support point 25a is moved forward and backward. As shown in FIG. 2, the servomotor 27 is connected to the control unit 6 by a control line S2 and is controlled by the control unit 6. Furthermore, a linear scale 29 (forward/backward position detection means) that detects a position (forward/backward position of the support rod 25) of the support point 25a in the Z-axis direction is installed in the cylinder 24 of each of the support units 23 and is connected to the control unit 6. The linear scale 29 is connected to the control unit 6 by a control line S3, and forward/backward position data of the support point 25a which is detected by the linear scale 29 is input into the control unit 6.

Two pressing units 33 (forward/backward drive means) are installed on each of the upper surfaces of the two movable beams 16. The pressing units 33, the total number of which is four, can be moved smoothly in the X-axis direction by guide rails 34 and linear bearings 35 that are laid on the upper surfaces of the movable beams 16. The pressing unit 33 is supported by the linear bearing 35, and has a movable bed 36 that has a substantially L shape when seen from the Y-axis direction. A servomotor 37 (actuator), a lifting and lowering unit 38, an axial lower pressing rod 39 and an axial upper pressing rod 40 that extend in the Z-axis direction, and a load cell 41 (load detection means) are configured to be mounted on the movable bed 36. The load cell 41 can be moved smoothly in the Z-axis direction by a guide rail 43 and a linear bearing 44 that are disposed in a vertical wall portion of the movable bed 36. The lower pressing rod 39 and the upper pressing rod 40 are coaxially connected with each other across the load cell 41, and the lower pressing rod 39 penetrates the lifting and lowering unit 38 in the Z-axis direction.

The lifting and lowering unit 38 is, for example, a screw jack. An axis of rotation of the servomotor 37 extends in the X-axis direction and axially communicates with an inner portion of the lifting and lowering unit 38 from a side surface thereof. A direction of rotation thereof is turned by 90 degrees by a gear (not shown) in the inner portion of the lifting and lowering unit 38, and is converted to a movement of the lower pressing rod 39 in the Z-axis direction. Accordingly, when the servomotor 37 is operated, the lower pressing rod 39, the load cell 41, and the upper pressing rod 40 are integrated with each other to slide in the Z-axis direction. The servomotor 37 is connected to the control unit 6 by a control line S4 (refer to FIG. 2) and is controlled by the control unit 6. A tip end of the upper pressing rod 40 is the pressing point 40a described above.

Furthermore, as shown in FIG. 2, a linear scale 45 (forward/backward position detection means) that detects a position (forward/backward position of the upper pressing rod 40) of the pressing point 40a in the Z-axis direction is installed in each of the pressing units 33 and is connected to the control unit 6. The linear scale 45 is connected to the control unit 6 by a control line S5, and forward/backward position data of the pressing point 40a that is detected by the linear scale 45 is input into the control unit 6. In addition, the load cell 41 detects a load that is added to the pressing point 40a and is connected to the control unit 6 by a control line S6. Load data that is detected by the load cell 41 is input into the control unit 6.

As described above, the support unit 23 can be moved in the Y-axis direction along the slit 15b of the upper cross beam 15. In addition, the pressing unit 33 can be moved in the X-axis direction along the movable beam 16, and can be moved in both the X-axis direction and the Y-axis direction since the movable beam 16 can be moved in the Y-axis direction. Accordingly, the support point 25a and the pressing point 40a can be moved independently of each other in a plane direction of the plate-shaped workpiece W.

Furthermore, all of the support points 25a and the pressing points 40a can be moved forward and backward independently of each other in the Z-axis direction by the support units 23 and the pressing units 33 that are the forward/backward drive means. The control unit 6 controls all of the support points 25a and the pressing points 40a.

In addition, as shown in FIGS. 2 to 4, the above-described reaction force absorbing devices 7 are disposed on both surfaces along the Y-axis direction of the curvature retaining device 1. Roller support stays 48 are disposed to be slidable in the Z-axis direction by roller lifting and lowering mechanisms 49 (refer to FIG. 4) in the two respective support columns 14 that are adjacent to each other in the Y-axis direction, and workpiece support rollers 50 (workpiece support members) that extend in the Y-axis direction are pivotally supported in a rotatable manner between the roller support stays 48. The roller support stays 48 and the workpiece support rollers 50 are biased from below by springs 51 (biasing means). The roller lifting and lowering mechanisms 49 on both sides that support one of the workpiece support rollers 50 can be manually lifted or lowered in the Z-axis direction, simultaneously on both of the sides, along with the spring 51 by height adjustment handle 52 and a height adjustment shaft 53. In FIG. 3, the roller lifting and lowering mechanisms 49 are shown in a simplified manner.

The plate-shaped workpiece W before curving is supported from below by the two workpiece support rollers 50, and the plate-shaped workpiece W can be sent in the plane direction (X-axis direction herein) by the workpiece support rollers 50 that are rolling elements. The spring 51 is set to have a biasing strength at which the weight of the plate-shaped workpiece W itself can be supported and a reaction force added by manipulating the plate-shaped workpiece W when curvature forming is performed on the plate-shaped workpiece W as described above can be absorbed.

An operation of the curvature retaining device 1 that has the above-described configuration will be described with reference to FIGS. 6A to 6D.

Figure 6A:
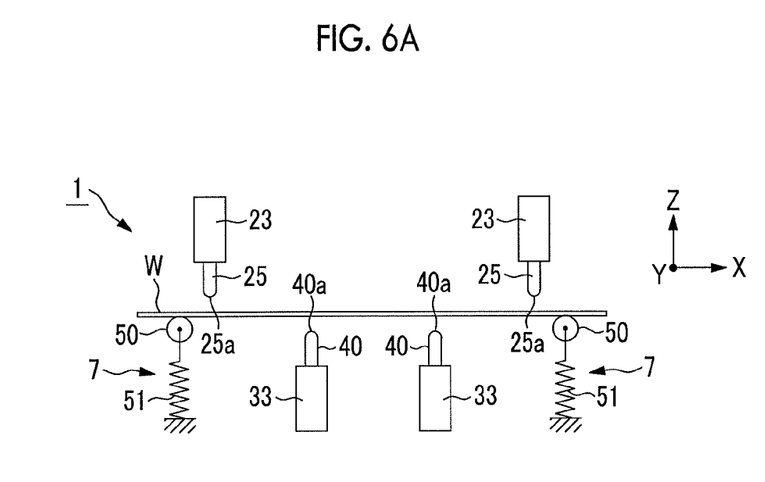
FIG. 6A is a view showing an operating sequence of the curvature retaining device and a state where a plate-shaped workpiece is placed on a workpiece support roller.

First, as shown in FIG. 6A, the plate-shaped workpiece W is placed on the workpiece support rollers 50. In this case, the support rods 25 (support points 25a) of the support units 23 and the upper pressing rods 40 (pressing points 40a) of the pressing units 33 are not in contact with the plate-shaped workpiece W. Accordingly, the weight of the plate-shaped workpiece W is retained by the workpiece support rollers 50. The height of the plate-shaped workpiece W can be adjusted in the Z-axis direction by the height adjustment handle 52 (refer to FIG. 4) of the roller lifting and lowering mechanism 49.

Figure 6B:
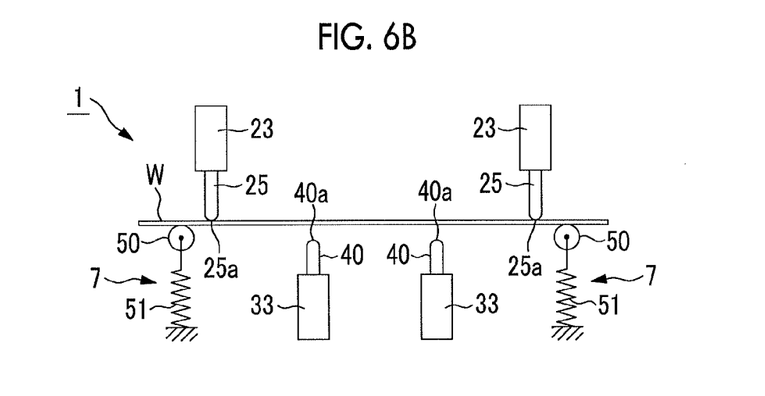
FIG. 6B is a view showing the operating sequence of the curvature retaining device and a state where a support point abuts against an upper surface of the plate-shaped workpiece.

Next, as shown in FIG. 6B, the support rods 25 of the support units 23 are lowered until the support points 25a abut against the upper surface of the plate-shaped workpiece W. This operation is performed by the control unit 6 controlling the servomotors 27 of the support units 23. A plurality of the support rods 25 do not have to be lowered to the same height.

Figure 6C:
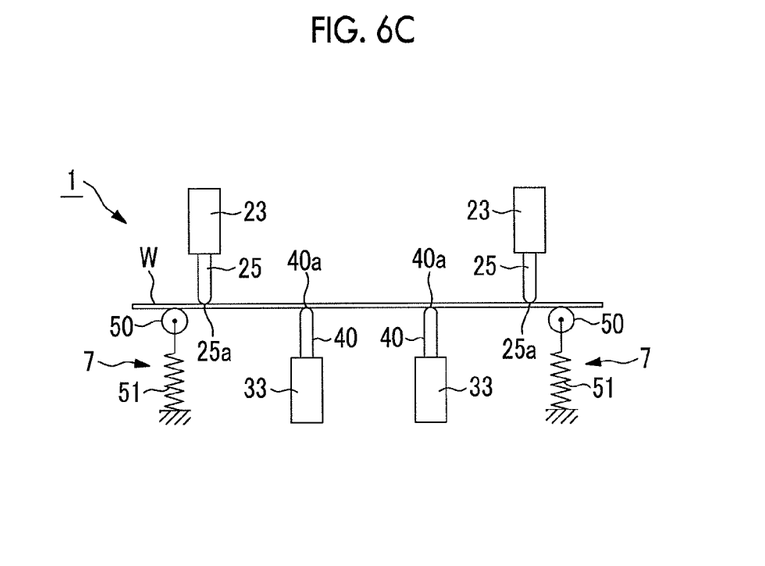
FIG. 6C is a view showing the operating sequence of the curvature retaining device and a state where a pressing point abuts against a lower surface of the plate-shaped workpiece.

Next, as shown in FIG. 6C, the upper pressing rods 40 of the pressing units 33 are lifted until the pressing points 40a abut against the lower surface of the plate-shaped workpiece W. This operation is performed by the control unit 6 controlling the servomotors 37 of the pressing units 33. A plurality of the upper pressing rods 40 do not have to be lifted to the same height.

Figure 6D:
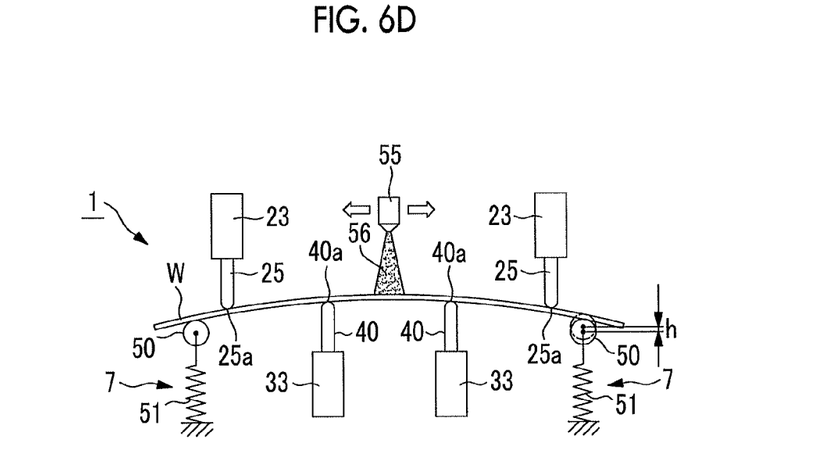
FIG. 6D is a view showing the operating sequence of the curvature retaining device and a state where the pressing point rises and the plate-shaped workpiece is curved.

Furthermore, as shown in FIG. 6D, the plate-shaped workpiece W is curved between the support points 25a of the support rods 25 and the pressing points 40a of the upper pressing rods 40 when the upper pressing rods 40 of the pressing units 33 are lifted above the position of FIG. 6C. A curvature in this case is set in the elastic deformation range of the plate-shaped workpiece W.

When the plate-shaped workpiece W is curved in this manner, an X-direction central portion of the plate-shaped workpiece W is manipulated upward, and thus both end portions of the plate-shaped workpiece W are moved downward and the reaction force is added to the workpiece support rollers 50. Since the biasing strength of the springs 51 of the workpiece support rollers 50 is set to be capable of absorbing the reaction force from the plate-shaped workpiece W, the workpiece support rollers 50 subjected to the reaction force are moved downward by a margin of h.

In a state where the plate-shaped workpiece W is curvature-retained in this manner, projection of a shot 56 is performed by, for example, a peening device 55. When the shot 56 is projected after the plate-shaped workpiece W is curved and retained in the elastic deformation range thereof in advance, elastic stress (stress) that is applied to the plate-shaped workpiece W accelerates deformation of the plate-shaped workpiece W, and thus formability of the plate-shaped workpiece W can be significantly increased.

The control unit 6 controls the curvature retaining device 1 in, for example, the following three manners.

(1) The plate-shaped workpiece W is curvature-retained as the forward/backward position data of the support points 25a and the pressing points 40a are input from the linear scales 29 and 45 and the servomotors 27 and the servomotors 37 are driven for the support points 25a and the pressing points 40a to be at a predetermined forward/backward position.

(2) The plate-shaped workpiece W is curvature-retained as the load data added to the pressing points 40a is input from the load cells 41 and the servomotors 37 are driven such that a predetermined load is added. This control may be performed along with the control of (1).

(3) The plate-shaped workpiece W is curvature-retained as the curvature data is input from the curvature measuring instrument 8 and the servomotors 37 are driven for a predetermined curvature. This control may be performed along with the controls of (1) and (2).

In a case of the control of (1), the control can be performed such that a relative distance between the support points 25a and the pressing points 40a becomes proper. In this manner, a relatively accurate curvature can be applied to the plate-shaped workpiece W.

In a case where the control of (2) is performed, an accurate curvature can be applied, by using a simple configuration, to the plate-shaped workpiece W after peen processing in a case, for example, where the peen processing is performed to cause a plastic deformation in a state where the plate-shaped workpiece W is curvature-retained as described above. In other words, a position retaining function may be applied for the support points 25a to be stopped at a height where the support points 25a reach the plate-shaped workpiece W regardless of relative relationship between the height of the plate-shaped workpiece W before curving and the height of the support points 25a, and then an accurate curvature can be applied to the plate-shaped workpiece W by moving the pressing points 40a to a plate-shaped workpiece W side while detecting the load added from the load cell 41 to the pressing points 40a. In this case, the height of the support points 25a do not have to be controlled, and thus the linear scale 29 can be omitted. In addition, the control unit 6 can be lowered in grade and the servomotors 27 can be replaced with less expensive air motors or the like, which can result in a simpler and less expensive device configuration.

In a case of the control of (3), relative positions of the support points 25a and the pressing points 40a are set by the control unit 6 driving the pressing units 33 until the plate-shaped workpiece W reaches a predetermined curvature. In this manner, an accurate curvature can be achieved since the relative positions of the support points 25a and the pressing points 40a are determined while an actual curvature of the plate-shaped workpiece W is measured.

In a case where the peen forming is performed by the peening device 55 projecting the shot 56 while the plate-shaped workpiece W is curved as described above, the control may be performed such that the peening device 55 is simultaneously controlled by the control unit 6, the load data that is input from the load cell 41 during the peen processing is monitored, and the projection of the shot 56 is stopped at a point of time when a decrease in the load data is stopped or at a point of time when the load data reaches a predetermined load value.

In a case of the above-described control, the reaction force to return the plate-shaped workpiece W to be flat decreases and the load data that is input from the load cell 41 to the control unit 6 decreases as the shot 56 is projected onto the curvature-retained plate-shaped workpiece W and the peen processing is in progress. Accordingly, curvature processing of the plate-shaped workpiece W can be determined to be completed and the peen processing can be completed at a point of time when a decrease in the load data is stopped or at a point of time when the load data reaches a predetermined load value. As such, time required for the peen processing can be minimized, and contribution can be made to shortening of processing time and reduction of labor.

As described above, the curvature retaining device 1 includes the two support points 25a that can abut against the one surface of the plate-shaped workpiece W, the pressing points 40a that can abut against the other surface of the plate-shaped workpiece W at the positions between the two support points 25a, the support units 23 that move the support points 25a forward to and backward from pressing point 40a sides, and the pressing units 33 that move the pressing points 40a forward to and backward from support point 25a sides.

Accordingly, the plate-shaped workpiece W can be pressed by the pressing points 40a such that the plate-shaped workpiece W can be curved when the plate-shaped workpiece W is interposed between the support points 25a and the pressing points 40a and the relative distance between the pressing points 40a and the support points 25a is shortened. In this case, any curvature can be set by the relative positions of the support points 25a and the pressing points 40a along the plane direction (X direction or Y direction) of the plate-shaped workpiece W, the quantity of the support points 25a and the pressing points 40a, the amount of pressing by the pressing points 40a (pressing stroke and/or pressing load), and the like.

However, the support point 25a and the pressing point 40a may not be arranged on the same straight line, but a twisted curved shape or the like can be applied to the plate-shaped workpiece W by shifting the relative positions of the support point 25a and the pressing point 40a in the plane direction of the plate-shaped workpiece W. As such, a curved shape can be freely applied to the plate-shaped workpiece W by the single curvature retaining device 1 regardless of the shape and size of the plate-shaped workpiece W, an intended curved shape, and the like.

Accordingly, the plate-shaped workpiece W can be curved by a simple and highly universal configuration without having to prepare a mold member such as a backing tool and a template as in the related art. Still, since the support point 25a and the pressing point 40a are in point contact with the plate-shaped workpiece W, even the integral skin 4 for an aircraft in which the outer plate 2 and the rib-shaped reinforcing member 3 are integrated with each other as shown in FIG. 1 can be simply curved by allowing the support points 25a or the pressing points 40a to abut against sites other than the rib-shaped reinforcing member 3.

In addition, as shown in FIG. 2, the curvature retaining device 1 has a basic positional relationship in which, when seen from the direction (Y-axis direction) that is orthogonal to the curved cross section of the plate-shaped workpiece W, the plate-shaped workpiece W is curvature-retained in a state where the two support points 25a abut against the one surface (for example, the upper surface) of the plate-shaped workpiece W at the distance Ls, the two pressing points 40a abut against the other surface (for example, the lower surface) of the plate-shaped workpiece W at the distance Lp which is shorter than the distance Ls between the support points 25a, and the middle point of the distance Ls between the support points 25a and the middle point of the distance Lp between the pressing points 40a match with each other on the center line Lc. Accordingly, the curvature of the plate-shaped workpiece W in a section between the two pressing points 40a can be uniform and symmetrical, and the plate-shaped workpiece W is likely to be consistent with a desired curvature. In addition, in a case where the curvature forming is performed on the curved plate-shaped workpiece W through the peen processing, the formability thereof can be increased.

In a case where an equal load is added to the two pressing points 40a that are arranged at an equal distance Ld from the two support points 25a, that is, positions of (Ls−Lp)/2 as shown in FIG. 2, the section (section Lp shown in FIG. 2) between the two pressing points 40a has a constant bending moment in a so-called pure bending state such that a uniform curvature is achieved. The maximum bending moment that is added to the section Lp between the two pressing points 40a is obtained by an equation of P·Ld/2 since the plate thickness of the plate-shaped workpiece W and the width in the Y-axis direction are uniform (P is a combined load of the two pressing points 40a).

In addition, in the curvature retaining device 1, the support point 25a can be moved independently in the Y-axis direction and the pressing point 40a can be moved independently in the X-axis direction and the Y-axis direction with respect to the plane direction of the plate-shaped workpiece W. Accordingly, the curved shape and the curvature of the plate-shaped workpiece W can be freely set to be capable of easily responding to even a complex composite curved surface by moving, for example, the position of either the support point 25a or the pressing point 40a in the plane direction of the plate-shaped workpiece W.

For example, the plate-shaped workpiece W can be curved into a distorted or twisted shape when the support points 25a and the pressing points 40a are arranged not to be lined up on a straight line in the direction that is orthogonal to the curved cross section of the plate-shaped workpiece W. Furthermore, the numbers of the support points 25a and the pressing points 40a that abut against the plate-shaped workpiece W can be adjusted to the quantity meeting the size or a curved area of the plate-shaped workpiece W.

Furthermore, in the curvature retaining device 1, all of the support points 25a and the pressing points 40a can be moved in the Z-axis direction, independently of each other, respectively by the support units 23 and the pressing units 33. Accordingly, the forward/backward positions (amounts of protrusion) of the plurality of support points 25a and the plurality of pressing points 40a with respect to the plate-shaped workpiece W can be different from each other. As such, the plate-shaped workpiece W can be likely to be curvature-retained on the complex composite curved surface or the like.

In addition, the curvature retaining device 1 includes the reaction force absorbing device 7 that supports the plate-shaped workpiece W from below, and the workpiece support rollers 50 of the reaction force absorbing device 7 are biased from below by the springs 51. The spring 51 is set to have the biasing strength at which the weight of the plate-shaped workpiece W itself can be supported and the reaction force added by manipulating the plate-shaped workpiece W when the curvature forming is performed on the plate-shaped workpiece W can be naturally absorbed.

Accordingly, the plate-shaped workpiece W before the curvature retaining can be reliably retained by the workpiece support rollers 50, and thus stability can be increased. In addition, although the plate-shaped workpiece W is manipulated and the reaction force is added to the workpiece support rollers 50 when the curvature retaining is initiated, the reaction force of the plate-shaped workpiece W is absorbed by the springs 51 that bias the workpiece support rollers 50 in this case, and thus no unnecessary external force is added to the plate-shaped workpiece W and the plate-shaped workpiece W is likely to be curved into a desired shape.

The workpiece support rollers 50 are the rolling elements, and can send the plate-shaped workpiece W that is placed thereon in the X-axis direction. Accordingly, in a case where the plate-shaped workpiece W having a large area is subjected to curvature forming, the plate-shaped workpiece W is sent in the X-axis direction after the curvature retaining at a predetermined site is completed and pressurization by the support points 25a and the pressing points 40a is released for a moment, and the pressurization by the support points 25a and the pressing points 40a is performed again such that other sites of the plate-shaped workpiece W is curved with ease.

The support unit 23 that moves the support point 25a forward and backward is configured to transmit the power of the servomotor 27 to the support point 25a via the ball screw mechanism 28. Accordingly, when the plate-shaped workpiece W is installed between the support point 25a and the pressing point 40a and the plate-shaped workpiece W is curved by shortening the distance between the support point 25a and the pressing point 40a with the support unit 23, the support point 25a that is moved forward and backward via the ball screw mechanism 28 is not moved backward with respect to a pressurizing force added from the pressing point 40a. As such, the amount of pressing and a pressing force by the pressing point 40a can be controlled with accuracy, and the formability of the plate-shaped workpiece W can be increased.

The present invention is not limited to the configuration of the above-described embodiment, but appropriate modifications and improvements can be added thereto without departing from the scope of the present invention and embodiments to which such modifications and improvements are added are also included in the scope of the present invention. For example, the up-down relationship between the support points 25a and the pressing points 40a may be reversed although the support points 25a abut against the upper surface of the plate-shaped workpiece W and the pressing points 40a abut against the lower surface of the plate-shaped workpiece W in the above-described embodiment.

In addition, although the workpiece support rollers 50 are used as the workpiece support members in the above-described embodiment, spherical or caster-shaped workpiece support members may be used instead of the rollers. In this case, the plate-shaped workpiece W can be moved in not only the X-axis direction but also the Y-axis direction and other directions.

REFERENCE SIGNS LIST

1 Curvature retaining device
4 Integral skin
6 Control unit (control means)
7 Reaction force absorbing device
8 Curvature measuring instrument (curvature detection means)
23 Support unit (forward/backward drive means)
25 Support rod
25a Support point
27, 37 Servomotor (actuator)
28 Ball screw mechanism
29, 45 Linear scale (forward/backward position detection means)
33 Pressing unit (forward/backward drive means)
40 Upper pressing rod
40a Pressing point
41 Load cell (load detection means)
50 Workpiece support roller (workpiece support member)
51 Spring (biasing means)
Ls Distance between support points (first distance)
Lp Distance between pressing points (second distance)
Lc Center line
W Plate-shaped workpiece

The invention claimed is:

1. A curvature retaining device for a plate-shaped workpiece curving and retaining the plate-shaped workpiece in an elastic deformation range thereof, the curvature retaining device comprising:
   two support points configured to abut against two separate points of one surface of the plate-shaped workpiece as seen from a direction orthogonal to a curved cross section of the plate-shaped workpiece;
   two pressing points configured to abut against positions of the other surface of the plate-shaped workpiece between the support points as seen from the direction orthogonal to the curved cross section of the plate-shaped workpiece;
   forward/backward drive means for moving at least either the two support points or the two pressing points forward and backward in a thickness direction of the plate-shaped workpiece;
   load detection means for detecting a load added to the two pressing points; and
   control means into which load data from the load detection means is input, the control means driving the forward/backward drive means such that a predetermined load is added,
   wherein the control means performs control such that projection of a shot is stopped at a point of time when a decrease in the load data input from the load detection means is stopped, or at a point of time when the load data reaches a predetermined load value in a case where peen forming is performed through the projection of the shot while the plate-shaped workpiece is curved,
   wherein the two support points abut against the one surface of the plate-shaped workpiece at a first distance therebetween, and the two pressing points abut against the other surface of the plate-shaped workpiece at a second distance therebetween shorter than the first distance as seen from the direction orthogonal to the curved cross section of the plate-shaped workpiece,
   wherein a middle point of the first distance and a middle point of the second distance match with each other, and
   wherein at least either of the two support points or either of the two pressing points are configured to be moved independently in a plane direction of a surface, the surface being perpendicular to the thickness direction, of the plate-shaped workpiece.

2. The curvature retaining device for a plate-shaped workpiece according to claim 1,
   wherein the forward/backward drive means is disposed to be capable of moving each of the two support points and each of the two pressing points forward and backward independently from each other.

3. The curvature retaining device for a plate-shaped workpiece according to claim 1, further comprising a workpiece support member supporting the plate-shaped workpiece from below,
   wherein the workpiece support member is biased from below by biasing means, and
   wherein the biasing means is set to have a biasing strength at which a weight of the plate-shaped workpiece itself is supported and absorbs a reaction force added by manipulating the plate-shaped workpiece when curvature forming is performed on the plate-shaped workpiece.

4. The curvature retaining device for a plate-shaped workpiece according to claim 3,
wherein the workpiece support member is a rolling element and is configured to send the plate-shaped workpiece placed thereon in a plane direction of the plate-shaped workpiece.

5. The curvature retaining device for a plate-shaped workpiece according to claim 1,
wherein the forward/backward drive means for moving at least either the two support points or the two pressing points forward and backward is configured to transmit power of an actuator to at least one of the two support points via a ball screw mechanism.

6. The curvature retaining device for a plate-shaped workpiece according to claim 1 further comprising
forward/backward position detection means for detecting a forward/backward position of each of the two support points and the two pressing points
wherein the control means drives the forward/backward drive means such that the two support points and the two pressing points are at predetermined forward/backward positions, and forward/backward position data from the forward/backward position detection means is input into the control means.

7. The curvature retaining device for a plate-shaped workpiece according to claim 1 further comprising
curvature detection means for detecting a curvature of the plate-shaped workpiece
wherein curvature data from the curvature detection means is input to the control means to drive the forward/backward drive means for a predetermined curvature.

8. The curvature retaining device for a plate-shaped workpiece according to claim 1,
wherein the control means is input the load data, which is added to the two pressing points, from the load detection, and drives the forward/backward drive means such that a predetermined load is added, and retains the curvature of the plate-shaped workpiece.

\* \* \* \* \*